US012596347B2

(12) United States Patent　　　　　(10) Patent No.: US 12,596,347 B2
Lochbihler　　　　　　　　　　　　　(45) Date of Patent: Apr. 7, 2026

(54) DATA INTERFACE DEVICE FOR TRANSMITTING TOOL DATA, MANUFACTURING SYSTEM AND NUMERICALLY CONTROLLED MACHINE TOOL

(71) Applicant: DECKEL MAHO Pfronten GmbH, Pfronten (DE)

(72) Inventor: Thomas Lochbihler, Vils (AT)

(73) Assignee: DECKEL MAHO Pfronten GmbH, Pfronten (DE)

( * ) Notice: Subject to any disclaimer, the term of this patent is extended or adjusted under 35 U.S.C. 154(b) by 313 days.

(21) Appl. No.: 18/360,979

(22) Filed: Jul. 28, 2023

(65) Prior Publication Data

US 2024/0061397 A1　　Feb. 22, 2024

(30) Foreign Application Priority Data

Aug. 16, 2022　(DE) ..................... 10 2022 120 660.2

(51) Int. Cl.
G05B 19/408　　　(2006.01)

(52) U.S. Cl.
CPC .................... G05B 19/4083 (2013.01); G05B 2219/35373 (2013.01); G05B 2219/35519 (2013.01)

(58) Field of Classification Search
CPC .............. G05B 19/408; G05B 19/4083; G05B 2219/50253; G05B 2219/35373; G05B 2219/35519
See application file for complete search history.

(56) References Cited

U.S. PATENT DOCUMENTS

2002/0193905 A1* 12/2002 Davison ............. G05B 19/4185
　　　　　　　　　　　　　　　　　　　700/86
2003/0014149 A1　1/2003 Kreidler et al.
(Continued)

FOREIGN PATENT DOCUMENTS

DE　　　10230895 A1　3/2003
DE　102016217443 A1　9/2017
(Continued)

OTHER PUBLICATIONS

Office Action dated Jun. 10, 2025 for JP App. Ser. No. 2023-124120 with English language translation.
(Continued)

*Primary Examiner* — Stephen Holwerda
(74) *Attorney, Agent, or Firm* — Henricks Slavin LLP

(57) ABSTRACT

A data interface device including a first interface module configured for data transmission with a tool data management device, a second interface module configured for data transmission with a control device of a numerically controlled tool machine, and a data processing unit. The data interface device is configured to receive tool data of a tool usable in numerically controlled machine tools from the tool data management device via the first interface module and to transmit the tool data to the control device of the machine tool via the second interface module. The second interface module is connectable to a plurality of control devices of numerically controlled machine tools, and the data processing unit is configured to convert a data format of the tool data received via the first interface module into a target data format readable by a respective control device which receives the tool data.

23 Claims, 2 Drawing Sheets

(56) References Cited

U.S. PATENT DOCUMENTS

| | | | | |
|---|---|---|---|---|
| 2012/0116570 A1* | 5/2012 | Nishioka | ............ | B23Q 3/15503 |
| | | | | 700/179 |
| 2019/0118319 A1* | 4/2019 | Kitamura | ........... | B23Q 3/15503 |
| 2019/0232448 A1 | 8/2019 | Mayr et al. | | |
| 2020/0033836 A1* | 1/2020 | Hayashi | ........... | G05B 19/40938 |
| 2020/0396308 A1* | 12/2020 | Von Hoyningen-Huene | .............. | |
| | | | | H04L 67/566 |
| 2021/0086325 A1* | 3/2021 | Haimer | ................. | B24B 41/042 |

FOREIGN PATENT DOCUMENTS

| | | | |
|---|---|---|---|
| DE | 102017202360 A1 | 8/2018 |
| DE | 102018214840 A1 | 3/2020 |
| EP | 3357637 A1 | 8/2018 |
| EP | 3520956 A1 | 8/2019 |
| EP | 3889708 A1 | 10/2021 |
| JP | 02-232150 A | 9/1990 |
| JP | 05-84631 A | 4/1993 |
| JP | 07-001272 A | 1/1995 |
| JP | 2020-508510 A | 3/2020 |
| JP | 2020-530923 A | 10/2020 |
| WO | WO 2019/020775 A1 | 1/2019 |

OTHER PUBLICATIONS

Extended European Search Report dated Aug. 27, 2024 for EPO App. Ser. No. 23190992.0 with English language translation.

Sinumerik—Sinumerik 840D sl—MCIS TDI Ident Connection sl ED—Dari Kuhn, ip.com, Aug. 10, 2010, XP013139531.

Office Action dated Apr. 18, 2023 for DE App. Ser. No. 10 2022 120 660.2 with English language translation.

Wikipedia, Jun. 18, 2022, "Tool Changer," https//de.wikipedia.org/wiki/Werkzeugwechsler (English language translation).

Office Action dated Dec. 10, 2024 for JP App. Ser. No. 2023-124120 with English language translation.

* cited by examiner

DATA INTERFACE DEVICE FOR TRANSMITTING TOOL DATA, MANUFACTURING SYSTEM AND NUMERICALLY CONTROLLED MACHINE TOOL

TECHNICAL FIELD

The present invention relates to a data interface device for transmitting tool data, a manufacturing system, and a numerically controlled machine tool.

BACKGROUND OF THE INVENTION

In the field of automated manufacturing, the management of the tools used therein plays an essential role. In this manner, while machining a workpiece on a machine tool, for example, a large number of different tools are used for the individual machining steps. The properties of these tools have such a strong influence on the respective machining step that it is essential to take the properties of the individual tools into account during workpiece machining, in order to achieve a high machining quality.

For this purpose, numerically controlled machine tools are known from the state of the art, which are provided with tool data for workpiece machining, which describe a tool usable by the machine tool, for example unbalance data of the tool.

Tool data management, which is a part of tool management, plays an essential role in automated manufacturing, i.e., said tool data can be taken into account during the control of the machine tool in the course of workpiece machining in order to compensate machining errors caused by a specific tool, hence increasing the machining quality. The tool data is tool-specific and differ from each other not only in case of different tools, but also in case of tools of the same type. Consequently, each individual tool usually requires its own set of tool data, which, in fact, is constantly changing over the tool's lifetime, for example due to wear and the like.

The tool-specific tool data is usually acquired in advance by measuring the tool on a so-called presetting device and providing them to the machine tool.

For example, WO 2019/020775 A1 discloses a system with a presetting device for measuring imbalances of a tool and a numerically controlled machine tool associated with said presetting device. A tool data storage of the machine tool is connected to the presetting device via a data interface and receives tool datasets in the form of balancing protocols transmitted from the presetting device. Said balancing protocols can be evaluated by a control device of the machine tool in the course of a tool selection for a machining step to be performed in such a way that the control device is configured to reject a tool intended for a machining step, if its balancing data described by the respective balancing protocol are too bad and an intended machining quality could not be maintained.

Especially in the field of automated mass production with a large number of numerically controlled machine tools, on each of which a large number of tools can be used, there is a lack of an efficient cross-machine tool management, especially in the area of tool data management. Consequently, there are many cases for which tool data must even be entered manually by a machine operator at the respective control device of the individual machine tools, which can be both, time-consuming and error-prone.

SUMMARY OF THE INVENTION

Thus, it is an object of the present invention to provide means for an efficient tool management for automated mass production.

For solving this problem a data interface device according to claim 1, a manufacturing system according to claim 13, and a numerically controlled machine tool according to claim 18 are provided.

The respective dependent claims refer to preferred embodiments, each of which may be provided individually or in combination.

According to a first aspect of the invention, a data interface device for transmitting tool data to a control device of a numerically controlled machine tool is provided. The data interface device comprises a first interface module, which is configured for data transmission with a tool data management device, and a second interface module, which is configured for data transmission with a control device of a numerically controlled machine tool, wherein the data interface device is configured to receive tool data of a tool usable in numerically controlled machine tools from the tool data management device via the first interface module and to transmit the tool data to the control device of the machine tool via the second interface module. The second interface module can thereby be connected to a plurality of control devices of numerically controlled machine tools, wherein the data interface device comprises a data processing unit which is configured to convert a data format of the tool data received via the first interface module into a target data format which can be read out by a respective control device, receiving the tool data, of the plurality of control devices, in such a way that the machine tool associated with the respective control device can be controlled in dependence of the tool data received by the respective control device.

In this way, a data interface device is provided that allows a plurality of machine tools to be linked to a tool data management device, independent of any particular machine-specific data format. In this way, control devices from a wide variety of manufacturers can be connected to the data interface device, which serves as a universal translator for the tool data and ensures that a respective control device receives tool data in a data format that can be used by it.

Thus, there is no need for a plurality of tool data management devices, each configured to a particular type or design of control device, in order to be able to provide tool data to them; instead, it is basically sufficient to provide one tool data management device whose tool data is translated via the data interface device according to the invention, which is particularly advantageous in the field of automated mass production, in which a tool can be used on a plurality of different machine tools, for example. Likewise, the number of tool data management devices provided, for example, in the form of presetting devices, can ideally be reduced to one presetting device in a whole production hall.

Depending on the control device, the data format of the tool data that can be used or read by the control device (respective target data format) differs, for example, due to different designs or different manufacturers. If tool data is not transferred in the target data format of the respective control device, it is not read out or is read out incorrectly, which can lead, among other things, to error messages with loss of function or a decrease of the machining quality on the machine tool.

The different data formats are expressed, for example, in different units of individual tool characteristics (cm vs. inches, minutes vs. seconds, etc.), the type of information or simply in the storage sequence of said tool characteristics. For example, a first control device expects a tool radius in cm, whereas a second control device expects a tool radius in mm, and a third control device even expects a tool diameter instead of a tool radius.

Complex adjustments of the tool data, which may have to be carried out manually by a machine operator, are thus no longer necessary, so that a respective control device receives tool data which can be evaluated in a simple and efficient manner and which can then be used to control the machine tool, for example as part of a tool selection for a machining step or for process control during the use of a tool described by the tool data.

In this context, the tool data management device is to be understood as any device for managing tool data, which preferably comprises a storage device, usually comprising an electronic storage medium, for storing the tool data to be managed and/or also a data processing device which is configured for modifying tool data, for example in order to create new data records with tool data on the tool data management device itself, to update existing ones or, if necessary, to delete them.

The tool data of a tool describes properties of the tool and contains one or more tool characteristics that describe the associated physical tool. The tool characteristics can be, for example and not restrictively, geometric data (radius, diameter), dynamic data (unbalance, natural frequencies) or historical data (total time of usage).

The tool data management device may be provided in various embodiments. Non-limiting examples are an embodiment as a tool data management device provided in a local network for data transmission or an embodiment as a cloud-based tool data management device in which the data transmission with the data interface device takes place via an internet connection. In this case, only a part of the tool data management device, in particular the storage device, can be cloud-based. The provision of a cloud-based tool data management device thus permits, for example, use of the tool data management device across different locations.

Preferred and advantageous embodiments of the data interface device according to the first aspect of the invention are described below.

In a preferred embodiment, the data interface device comprises a storage unit in which configuration data is stored, which assigns to each control device from the plurality of control devices a data format for tool data readable by the respective control device from a plurality of data formats, wherein the data processing unit is configured to select the target data format on the basis of the configuration data stored in the storage unit.

Thus, the configuration data contains respective translation instructions in the form of the target data formats for the plurality of control devices, wherein the data interface device independently selects the target data format based on the configuration data in dependence on the control device receiving the tool data.

The configuration data can be expanded at any time to include additional target data formats, allowing new control devices to be easily integrated into a manufacturing system and to be addressed by the data interface device.

In a preferred embodiment, the data interface device is further configured to receive tool data of a tool from the plurality of control devices via the second interface module and to transmit the tool data to the tool data management device via the first interface module, wherein the data processing unit is configured to convert a data format of the tool data received via the second interface module into a data format readable by the tool data management device.

In this way, the data interface device is extended to include bidirectional functionality, in the course of which tool data can also be transmitted to the tool data management device, with the data interface device in turn acting as a universal translator.

For example, changes detected on a machine tool, such as a wear condition or total time of usage, can be transmitted to the tool data management device acting as a central management point, which thus has constantly updated information about the tool and can also make it available to other machine tools.

In a preferred embodiment, the tool data format used by the tool data management device is an OPC-UA data format. In particular, the entire tool data management device has an OPC-UA architecture.

OPC-UA stands for Open-Platform-Communications-Unified-Architecture and describes a standard for data exchange as a platform-independent, service-oriented architecture. The basic services defined by OPC are based on abstract method descriptions that are protocol-independent and provide the basis for the entire OPC-UA functionality. In this way, the tool data can be managed platform-independently in the tool data management device in the neutral OPC-UA data format, which is particularly well suited as a starting point for translation into control device-specific target data formats by the data interface device.

Preferably, the data interface device also has an OPC-UA architecture, which enables smooth and protocol-independent communication between the tool data management device and the data interface device, in particular via the first interface module. Thus, no separate communication protocol is necessary for this communication level, which would, for example, include serialization and deserialization of the tool data to be transmitted.

In a preferred embodiment, the second interface module is configured to select a communication protocol used by a respective control device of the plurality of control devices from a plurality of communication protocols for data transmission therewith.

Usually, when using a communication protocol, a serialization of the tool data to be transmitted takes place, which is thus transmitted in a sequential form from the transmitter (here the data interface device) to the receiver (here a control device), whereby the respective receiver must of course be able to use the respective communication protocol. The tool data transmitted by means of the communication protocol is deserialized after receipt by the control device and is then available to be used by the control device.

As non-limiting examples of the variety of communication protocols, a Transmission Control Protocol (TCP), preferably with binary coding, or a Simple Object Access Protocol (SOAP) may be mentioned.

In a preferred embodiment, the first interface module is configured to access tool data stored in a storage device of the tool data management device.

In this way, the data interface device can itself access the tool data in the tool data management device as part of a pull functionality.

In a preferred embodiment, the data interface device is configured to store tool data of a tool in the storage device of the tool data management device via the first interface module and/or to change and/or delete tool data of a tool stored therein.

In this way, the data interface device is also authorized to modify the tool data stored in the storage device, so that a change in the tool data received by the data interface device from a third party, for example from a measuring device of a machine tool, can be entered by the data interface device into the storage device of the tool data management device, in order to always be able to provide up-to-date tool data for the specific tool.

Usually, storing tool data in the storage device is preceded by creating an empty data object in which the tool data is subsequently stored, provided that no tool data for the specific tool has yet been stored in the storage device.

Thus, the data interface device is preferably configured to create an empty data object for a tool via the first interface module in the storage device of the tool data management device and to subsequently store tool data of this tool in the empty data object.

In this way, a separate data object can be generated for each new tool, which is then filled with the tool data to be saved.

Said data object can be any object for the structured storage of data, for example a list or an array, which is particularly present as a separate file in the storage device.

In a preferred embodiment, the data interface device is configured to receive, via the second interface module, a tool ID by which a specific tool is identifiable from a control device of the plurality of control devices, and to access, via the first interface module, tool data associated with the specific tool and stored in the storage device of the tool data management device on the basis of the received tool ID, and to transmit this tool data to the control device via the second interface module.

In this way, a pull functionality is provided starting from the machine tool or its control device, in the course of which tool data for a specific tool can be requested from the tool data management device via the data interface device. In this way, it is not necessary to keep all tool data in a storage unit of the control device, but these can be requested as needed, which, among other things, relieves the storage unit and also keeps the tool data up-to-date. In this way, after or before inserting a tool into a processing device or into a tool changer, the tool data associated with the tool can be requested in order to make them available to the control device for handling the inserted tool.

Preferably, the tool ID is a tool ID provided by the control device based on an identification unit attached to the tool in question, which may be, for example, a bar code or QR code or an RFID chip readable by a detection device of the machine tool.

In a preferred embodiment, the data interface device is configured to further receive, via the first interface module, together with the tool data of the tool, a machine ID by means of which a specific machine tool can be identified, wherein the second interface module is configured to select, on the basis of the received machine ID, a control device associated with the specific machine tool and to transmit the tool data received together with the machine ID via the first interface module to the selected control device.

In this way, a push functionality is provided starting from the tool data management device, in the course of which tool data can be transferred specifically to a desired or selected machine tool. For example, after creating new tool data at a presetting device of the tool data management device, the new tool data can be transferred directly to a selected machine tool on which the new tool is subsequently to be used.

In a preferred embodiment, the data interface device is configured to access a storage unit of a control device of the plurality of control devices via the second interface module and to store tool data of a tool therein and/or to change and/or delete tool data of a tool stored therein.

Usually, the storage of tool data in the storage unit is preceded by the creation of an empty data object in which the tool data is subsequently stored, provided that no tool data for the specific tool has yet been stored in the storage unit.

Thus, the data interface device is preferably configured to create an empty data object for a tool in the storage unit of the control device via the second interface module and to subsequently store tool data of this tool in the empty data object.

In this way, a separate data object can be generated for each new tool, which is then filled with the tool data to be saved.

In this way, the data interface device is also authorized to modify tool data stored in the storage unit, so that no further confirmation or the like is required on the part of the control device, for example by a machine operator, which further improves the push-functionality starting from the tool data management device.

In a preferred embodiment, the tool data of a tool includes one or more of the following tool characteristics:
a dynamic and/or static unbalance of the tool;
a diameter and/or radius of the tool;
a length of the tool;
a weight of the tool;
a total time of usage of tool; and
a degree of wear of the tool.

In this way, the tool characteristics influencing a machining step are provided, which can be taken into account during the control of the machine tool, which in turn can improve the machining quality.

Preferably, the tool data of a tool include at least one of:
a dynamic or static unbalance of the tool;
a diameter or radius of the tool; and
a length of the tool.

Particularly preferably, the tool data includes all of the above tool characteristics.

In a preferred embodiment, the data interface device is partially or totally cloud-based.

Thus, some or all of the components of the data interface device may be cloud-based, i.e., implemented not as part of local hardware components, but as part of a cloud computing device coupled via a network connection, in particular via the internet.

According to a second aspect of the invention, a manufacturing system is provided comprising a plurality of numerically controlled machine tools each comprising a control device configured to control the machine tool, a tool data management device for managing tool data of tools usable in numerically controlled machine tools, and a data interface device according to the first aspect of the invention having a first interface module for data transmission connected to the tool data management device and a second interface module for data transmission connected to each control device of the plurality of numerically controlled machine tools.

In this way, a manufacturing system is provided, which comprises the data interface device according to the invention described above, and thus, introducing the advantages already described into the manufacturing system.

The data interface device of the manufacturing system allows the linking of the plurality of machine tools with the at least one tool data management device, independent of a respective machine-specific data format. In this way, a manufacturing system can be provided in which control devices from a wide variety of manufacturers are used and are connected via the data interface device, which serves as a universal translator for the tool data and ensures that a respective control device receives tool data in a data format (target data format) that can be used by it.

Preferred and advantageous embodiments of the manufacturing system according to the second aspect of the invention are described below.

In a preferred embodiment, the tool data management device comprises a presetting device configured to detect at least one tool characteristic of a tool inserted into the presetting device and to generate tool data of the inserted tool based thereon.

Thus, the manufacturing system offers the possibility to generate tool data of new tools on the basis of the tool characteristic detected from the real, physical tool and/or to update existing tool data.

In a preferred embodiment, the presetting device is configured to send the generated tool data of the inserted tool to the data interface device and/or to store it in a storage device of the tool data management device and/or to change tool data of the inserted tool already stored there on the basis of the generated tool data.

In this way, tool data generated from the detected tool characteristic can be stored or changed in the storage device for central management or transmitted directly to the data interface device, in particular for further transmission to a control device. This provides a push functionality starting from the presetting device, in the course of which tool data can be transmitted to any receiver starting from the presetting device.

In a preferred embodiment, at least one machine tool of the plurality of machine tools comprises a tool magazine having a plurality of magazine slots each for receiving a tool, and a tool changing device configured to insert and remove tools at the magazine slots of the tool magazine, wherein the control device of the at least one machine tool is configured to select an unoccupied magazine slot from a set of unoccupied magazine slots of the tool magazine on the basis of tool data, provided to the control device, of a tool handled by the tool changing device, and to control the machine tool in such a way that the handled tool is inserted by the tool changing device into the selected unoccupied magazine slot of the tool magazine.

In this way, an improved handling of the tools at the machine tool is provided apart from the use during machining operations in the work space, which allows a targeted storage of the tools in a magazine slot best suited for this purpose based on the tool data.

The tools usually differ in shape and size, so that it may be necessary, for example, to leave neighboring magazine slots free in case of particularly large tools, as otherwise there would be a collision with tools located in them. Due to this problem, the selection of the respective magazine slots has always been carried out manually by a machine operator who selects a suitable magazine slot based on his knowledge the tool dimensions.

By selecting the magazine slot depending on the tool data, such processes can be automated and the machine tool is able to independently select a magazine slot suitable for the tool and to insert the tool directly into it by means of the tool changing device.

The magazine slot can be selected on the basis of geometric tool characteristics, but also on the basis of other tool characteristics. In this way, the tools can be automatically placed in magazine slots intended for a specific machining category, for example all milling heads in a first section of the tool magazine, all drill bits in a second section, and so on.

In a preferred embodiment, the tool data of the tool handled by the tool changing device provided to the control device of the at least one machine tool includes at least one geometric dimension of the tool, based on which the control device selects the unoccupied magazine slot.

According to a third aspect of the invention, a numerically controlled machine tool is provided, comprising a tool magazine comprising a plurality of magazine slots each for receiving a tool, a tool changing device configured to insert and remove tools at the magazine slots of the tool magazine, and a control device configured to control the machine tool, wherein the control device is configured to select an unoccupied magazine slot for the handled tool from a set of unoccupied magazine slots of the tool magazine on the basis of tool data of a tool handled by the tool changing device, wherein the tool data comprises at least a geometric dimension of the handled tool, and to control the machine tool in such a way that the handled tool is inserted into the selected unoccupied magazine slot of the tool magazine by the tool changing device.

In this way, a machine tool with a tool magazine is provided, which allows an improved handling of the tools on the machine tool apart from the use during machining operations in the work space and enables a targeted storage of the tools in a magazine slot best suited for this purpose based on tool data of the handled tool provided to the control device.

The tools usually differ in shape and size, so that it may be necessary, for example, to leave adjacent magazine slots free in the case of particularly large tools, as otherwise there would be a collision with tools located in them. Due to this problem, the selection of the respective magazine slots has always been carried out manually by a machine operator who selects a suitable magazine slot based on his knowledge about the tool dimensions.

By selecting the magazine slot depending on the tool data, such processes can be automated and the machine tool is able to independently select a magazine slot suitable for the tool and to insert the tool directly into it by means of the tool changing device.

Preferred and advantageous embodiments of the machine tool according to the third aspect of the invention are described below.

In a preferred embodiment, the machine tool comprises a detection device coupled to the control device, which is configured to detect at least one geometric dimension of a tool handled by the tool changing device and to provide this to the control device as tool data, on the basis of which the control device selects the unoccupied magazine slot.

In this way, the machine tool itself is configured to acquire tool data describing the tool being handled, on the basis of which the appropriate magazine slot is selected.

The detection device can be, for example, an optical detection device (laser- or camera-based) or a haptic detection device.

In a preferred embodiment, the machine tool comprises a detection device coupled to the control device, which is configured to detect a tool ID, by means of which a specific tool can be identified, of a tool handled by the tool changing device and to transmit it to the control device, wherein the control device is configured to access tool data associated with the handled tool stored in a storage unit of the control device on the basis of the received tool ID and to use them to select the unoccupied magazine slot.

In this way, the machine tool is extended by an identification possibility, on the basis of which the handled tool can be recognized and the tool data matching the tool can be read out from the storage unit of the control device.

The tool ID can be detected in different ways. For example, the detection device can be configured to optically detect tool IDs attached to the tool in the form of a bar code and/or a QR code and/or to detect these in the form of data stored on an RFID chip by means of an RFID reader.

In a preferred embodiment, the control device for receiving tool data of a tool is coupled to a data interface device according to the first aspect of the invention and is configured to store tool data received from the data interface device in the storage unit of the control device.

In this way, the machine tool can be integrated into a larger manufacturing system, for example, in which tool data is managed centrally via a tool data management device and distributed via the data interface device, which means that not all tool data has to be stored in the storage unit all the time.

In a preferred embodiment, the tool magazine is designed as a wheel magazine that is rotatably movable about an axis of rotation relative to a machine bed of the machine tool for aligning a magazine slot with respect to the tool changing device, wherein the magazine slots are arranged circumferentially and removal directions of the magazine slots extend radially with respect to the axis of rotation.

Wheel magazines offer a space-saving and flexible storage option for tools which, in interaction with the tool changing device of the machine tool, permit rapid insertion and removal of a tool from/into a magazine slot, in the course of which the wheel magazine is moved rotationally, in particular as a function of the tool data provided for the tool being handled, thus, considerably reducing changeover times.

In a preferred embodiment, the at least one geometric dimension of the handled tool is an outer diameter, an outer radius, or a length of the tool.

Preferably, the tool data of a tool further includes one or more of the following tool characteristics:

a dynamic and/or static unbalance of the tool;
a weight of the tool;
a total time of usage; and
a degree of wear of the tool.

According to a fourth aspect of the invention, a method for transmitting tool data to a control device of a numerically controlled machine tool using a data interface device, in particular a data interface device according to the first aspect of the invention, is provided. The method thereby comprises receiving tool data of a tool usable in numerically controlled machine tools from a tool data management device by the data interface device, selecting a control device of a machine tool to receive the tool data from a plurality of control devices connected to the data interface device, converting the received tool data into a target data format by the data interface device, and transmitting the converted tool data to the selected control device by the data interface device, wherein the converting comprises selecting the target data format, wherein the selected target data format is readable by the selected control device which receives the to-be-transmitted tool data, such that the machine tool associated with the selected control device is controllable in dependence of the tool data received from the selected control device.

Thus, the method provides a possibility to transmit tool data to a plurality of control devices in a particularly simple manner for use therein, wherein the tool data is converted into a suitable target data format from a plurality of available data formats to provide universal translation between the tool data management device and the plurality of control devices.

Preferred and advantageous embodiments of the method according to the fourth aspect of the invention are described below, the respective advantages of which are substantially the same as those of the data interface device according to the first aspect.

Preferably, the method comprises providing configuration data in a storage unit of the data interface device, wherein the configuration data assigns to each control device of the plurality of control devices a data format for tool data readable by the respective control device from a plurality of data formats, and selecting the target data format based on the configuration data stored in the storage unit.

Preferably, the tool data received by the tool data management device is tool data in an OPC-UA data format.

Preferably, the method comprises selecting a communication protocol from a plurality of communication protocols by the data interface device, provided that the selected communication protocol is usable by the selected control device, and wherein transmitting the converted tool data is performed using the selected communication protocol.

Preferably, transmitting the tool data comprises storing the transmitted tool data in a storage unit of selected control device, or changing tool data stored in said storage unit depending on the transmitted tool data.

Preferably, the method further comprises receiving, by the data interface device, a tool ID via which a specific tool is identifiable, from a control device of the plurality of control devices, wherein receiving tool data from the tool data management device further comprises selecting the tool data to be received from a storage device of the tool data management device in dependence of the received tool ID, and selecting the control device to receive the tool data further comprises selecting the control device that sent the tool ID.

Preferably, receiving the tool data further comprises receiving a machine ID by which a specific machine tool is identifiable, wherein selecting the control device to receive the tool data is performed in dependence of the received machine ID.

According to a fifth aspect of the invention, a method for inserting a tool into a tool magazine of a numerically controlled machine tool, in particular a machine tool according to the third aspect of the invention, is provided, wherein the tool magazine comprises a plurality of magazine slots each for receiving a tool. The method thereby comprises handling a tool by a tool changing device of the machine tool, providing tool data of the handled tool for use at a control device of the machine tool, wherein the tool data comprises at least a geometric dimension of the handled tool, selecting an unoccupied magazine slot from a set of unoccupied magazine slots of the tool magazine based on the provided tool data via the control device, and inserting the handled tool into the selected unoccupied magazine slot of the tool magazine by means of the tool changing device.

Thus, the method offers a possibility to manage tools at a tool magazine of a machine tool automatically on the basis of the tool data provided, in order to enable, among other things, an optimal occupancy of the tool magazine without manual intervention of a machine operator.

The handling can include, among other things, picking up the tool from a fixture of a working spindle of the machine tool or picking up the tool from a transport device positioned on the machine tool, which is configured to deliver tools to the machine tool.

Preferred and advantageous embodiments of the method according to the fifth aspect of the invention are described below, the respective advantages of which are substantially the same as those of the numerically controlled machine tool according to the third aspect.

Preferably, providing the tool data comprises detecting a geometric dimension of the tool handled by the tool changing device and generating tool data based on the detected geometric dimension.

Preferably, the method comprises detecting a tool ID, by which a specific tool is identifiable, of the tool handled by the tool changing device, wherein providing the tool data further comprises retrieving the tool data from a storage unit of the control device of the machine tool based on the detected tool ID.

Preferably, the at least one geometric dimension of the handled tool is an outer diameter, an outer radius, or a length of the tool.

Further aspects and advantages thereof, as well as more specific embodiments of the foregoing aspects and embodiments, are described below with reference to the drawings shown in the accompanying figures.

It is emphasized that the present invention is in no way limited to the examples of embodiments and their features described below. The invention further encompasses modifications of said embodiments, in particular those resulting from modifications and/or combinations of individual or multiple features of the described embodiments within the scope of protection of the independent claims.

DETAILED DESCRIPTION OF THE FIGURES

Figure 1:
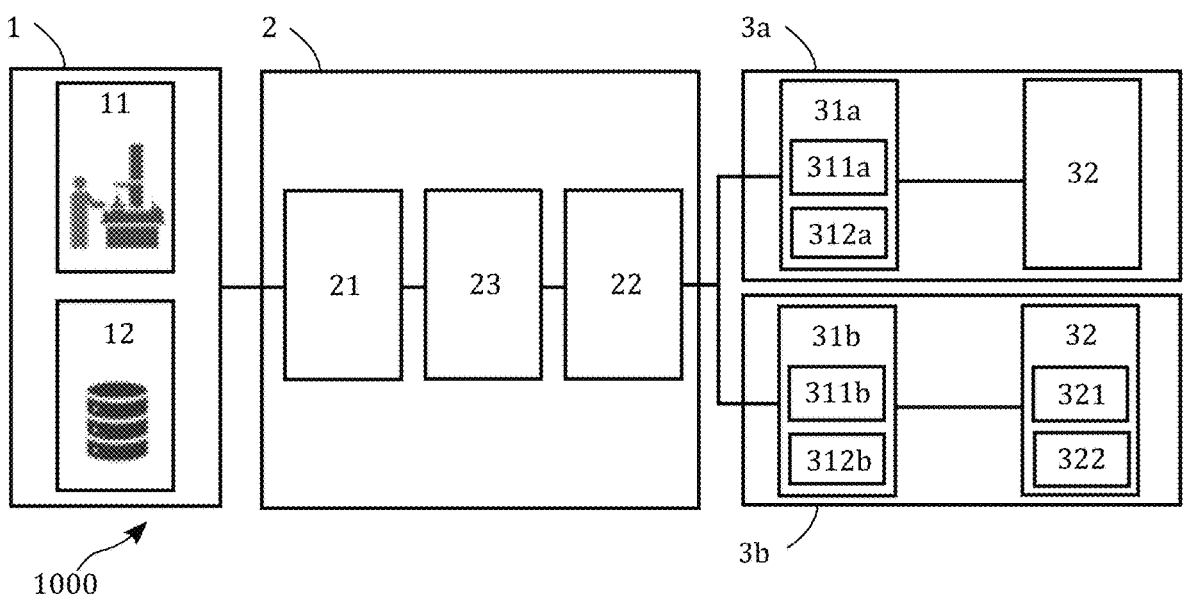
FIG. 1 shows a schematic view of an embodiment of the manufacturing system according to the invention.

FIG. 1 shows a schematic view of an embodiment of the manufacturing system 1000 according to the invention, comprising an embodiment of the data interface device 2 according to the invention.

The manufacturing system 1000 comprises a plurality of numerically controlled machine tools 3a, 3b, two of which are shown (first machine tool 3a, second machine tool 3b), a tool data management device 1 for managing tool data of tools usable in numerically controlled machine tools, and a data interface device 2 for transmitting tool data between the tool data management device 1 and control devices 31a, 31b of the machine tools 3a, 3b.

The respective connecting lines between the individual components of the manufacturing system 1000 represent data connections that can be implemented both wired and wirelessly.

First, the description of the embodiment of the data interface device 2 included in the manufacturing system 1000 is provided.

The data interface device 2 comprises a first interface module 21 configured for data transmission with the tool data management device 1 and a second interface module 22 configured for data transmission with the control devices 31a, 31b of the machine tools 3a, 3b.

The data interface device 2 is configured to receive tool data of a tool usable in numerically controlled machine tools from the tool data management device 1 via the first interface module 21 and to transmit this data to one or both control devices 31a, 31b of the machine tools 3a, 3b via the second interface module 22. The second interface module 21 is thus connectable to the plurality of control devices 31a, 31b.

Furthermore, the data interface device 2 comprises a data processing unit 23 which is configured to convert a data format of the tool data received via the first interface module 21 into a target data format which can be read out by a respective control device 31a; 31b of the plurality of control devices 31a, 31b receiving the tool data, such that the machine tool 3a; 3b associated with the receiving control device 31a; 31b can be controlled in dependence on the tool data received from the control device 31a; 31b.

The data format of the tool data received by the first interface module 21 (and the data format used by the tool data management device 1) in the shown embodiment is an OPC-UA data format, on the basis of which the tool data is managed platform-independently on the part of the tool data management device 1 in the neutral OPC-UA data format, which is particularly well-suited as a starting point for translation into the control device-specific target data formats by the data interface device 2 or by its data processing unit 23.

The control devices 31a, 31b process the tool data in the shown example in different data formats, of which the appropriate one is selected by the data interface device 2 as target data format for the transmission of tool data. The respective data format that can be used by the control devices 31a, 31b is usually manufacturer-specific and/or model-specific. For example, control devices from SIE-MENS use a different data format than control devices from HEIDENHAIN.

In the manufacturing system 1000 shown, the data interface device 2 functions particularly advantageously as a translating interface between the plurality of machine tools 3a, 3b and the tool data management device 1, in fact, independently of a respective machine-specific data format. In this way, control devices from a wide variety of manufacturers can be connected to the data interface device 2, which serves as a universal translator for the tool data and ensures that a respective control device receives tool data in a data format that can be used or read by it.

The data interface device 2 described above is not limited to be used in the manufacturing system 1000 shown in FIG. 1, but can be used in manufacturing systems of any design.

The following is a description of the remaining components of the manufacturing system 1000.

The tool data management device 1 comprises a presetting device 11 and a storage device 12, whereby the latter may be designed as a data management system with an additional data management device.

The presetting device 11 is configured to detect at least one tool characteristic of a tool inserted into the presetting device and, based on this, to generate tool data of the inserted tool, which can either be sent directly to the data interface device 2, or can be stored in the storage device 12 of the tool data management device 1 and, if required, be transmitted via the data interface device 2 to one or more control devices 31a, 31b. This is done either by the data interface device 2 itself accessing tool data in the storage device 12, or by the tool data management device 1 transmitting it to the data interface device 2.

In this way, tool data generated from the detected tool characteristic can be stored or modified in the storage device 12 for central management or transmitted directly to the data interface device 2, in particular for further transmission to a control device 31*a*, 31*b*. This provides a push functionality starting from the presetting device 11, in the course of which tool data can be transmitted from it to any receiver.

The storage device 12 of the tool data management device 1 as well as parts or the entire data interface device 2 may be cloud-based.

The control devices 31*a*, 31*b* each comprise a storage unit 311*a*, 311*b* for storing tool data and a control unit 312*a*, 312*b*, each of which is configured to control actuators 32 of the respective machine tools 3*a*, 3*b* as a function of the tool data received in the respective target data format and/or tool data stored in the storage units 311*a*, 311*b*.

Said actuators 32 can be, for example, positioning devices of the machine tool, in particular positioning devices for realizing relative movements between the tool and the workpiece during machining, or a tool-carrying working spindle, or other controllable actuators of the machine tool. The actuators usually comprise one or more controllable drives. Exemplarily, the second machine tool 3*b* comprises as actuators 32 a tool magazine 321 and a tool changing device 322.

The exemplary tool magazine 321 comprises a plurality of magazine slots each for receiving a tool, and the tool changing device 322 is configured for inserting and replacing tools at the magazine slots of the tool magazine 321, which may be designed in particular as a wheel magazine.

The control device 31*b* or its control unit 312*b* is preferably configured to select an unoccupied magazine slot for said tool from a set of unoccupied magazine slots of the tool magazine 321 on the basis of tool data provided to the control device 31*b* (either received directly via the data interface device 2 or stored in the storage unit 311*b*) of a tool handled by the tool changing device 322 and to control the machine tool 3*b*, in particular drives of the tool magazine 321 and/or of the tool changing device 322, in such a way that the handled tool is inserted by the tool changing device 322 into the selected unoccupied magazine slot of the tool magazine 321.

By selecting the magazine slot depending on the tool data, an automated process is provided in the course of which the machine tool 3*b* is able to select a magazine slot suitable for the tool independently and without the intervention of a machine operator and to insert the tool directly into this slot by means of the tool changing device 322.

The magazine slot can be selected on the basis of geometric tool characteristics, but also on the basis of other tool characteristics.

Figure 2:
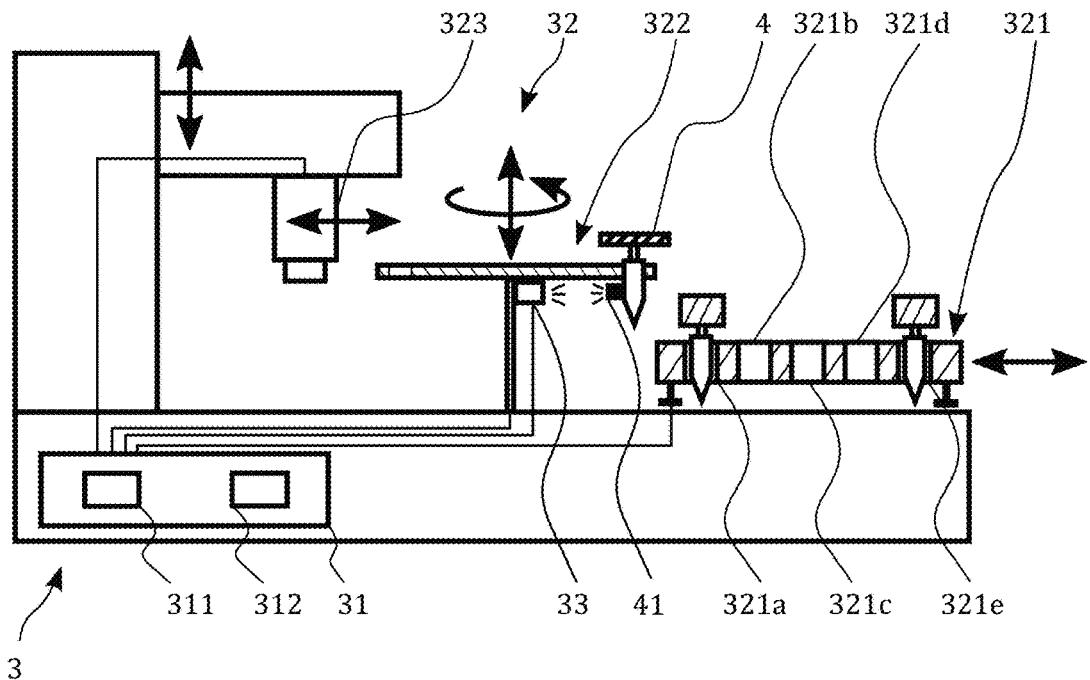
FIG. 2 shows a schematic view of an embodiment of the machine tool with tool magazine according to the invention.

FIG. 2 shows a schematic view of an embodiment of the machine tool 3 according to the invention with tool magazine 321.

The machine tool 3 can also be used, for example, in the manufacturing system shown in FIG. 1, provided that it or its control device 31 is connected to the data interface device 2 shown there for data transmission.

The machine tool 3 comprises a control device 31 for controlling the machine tool 3 or for controlling actuators 32 of the machine tool 3, which includes, among other things, said tool magazine 321, which in turn comprises a plurality of magazine slots 321*a-e* each for receiving a tool, a working spindle 323, and a tool changing device 322, which is configured for inserting and removing tools at the magazine slots 321*a-e* of the tool magazine 321 and at a receiving means of the working spindle 323.

Possible traverse movements of the actuators are shown by arrows in FIG. 2. Thus, the working spindle 323 can be moved vertically and horizontally, the tool changing device 322 can be moved vertically and can be rotated, and the tool magazine 321 can be moved horizontally, whereby the possible movements are to be understood as merely exemplary and not limiting.

The control device 31 is configured to select an unoccupied magazine slot 321*c* for the handled tool 4 from a set of unoccupied magazine slots 321*b-d* of the tool magazine 322 on the basis of tool data provided to the control device 31 (for example in a storage unit 311 of the control device 3) for a tool 4 handled by the tool changing device 322, wherein the tool data comprises at least one geometric dimension of the handled tool 4, and to control the machine tool 3 or its actuators 32 via the control unit 312 of the control device 31 in such a way that the handled tool 4 is inserted by the tool changing device 322 into the selected unoccupied magazine slot 321*c* of the tool magazine 321.

Thus, the machine tool 3 permits an improved handling of the tool 4 on the machine tool 3 apart from its use in machining operations in the work space, wherein a selective deposition of the tool 4 in a magazine slot 321*c* best suited for this purpose is made possible on the basis of the tool data of the handled tool 4 provided to the control device.

In the present case, the handled tool 4 has such a large tool radius that it protrudes into adjacent magazine slots. Based on the associated tool data, which for example contains said information about the tool radius, the middle magazine slot 321*c* of the free magazine slots 321*b-d* is therefore selected by the control device 31 in order to avoid a collision with the tools already inserted in the magazine slots 321*a*, 321*e*.

In the course of providing the tool data for selecting the magazine slot, the machine tool 3 further comprises a detection device 33, which is configured to detect a tool ID of the handled tool 4, via which a specific tool can be identified. In the present embodiment, the detection device 33 is thereby configured to read an RFID chip 41 attached to the tool 4, in which the tool ID is stored. Based on the detected tool ID, the control device 31 is now configured to access the tool data associated with the handled tool 4 and stored in the storage unit 311 of the control device 31. If the tool data is not stored in the storage unit 311, the required tool data of the handled tool 4 could be requested via a data interface device in case of a coupling to a tool data management device and then be transmitted to the control device 31.

Thus, the machine tool 3 is capable of independently recognizing the handled tool 4, selecting the associated tool data and, on the basis of these, and selecting a suitable magazine slot 321*c* and inserting the handled tool 4 into it, without any intervention by a machine operator.

Figures 3, 4:
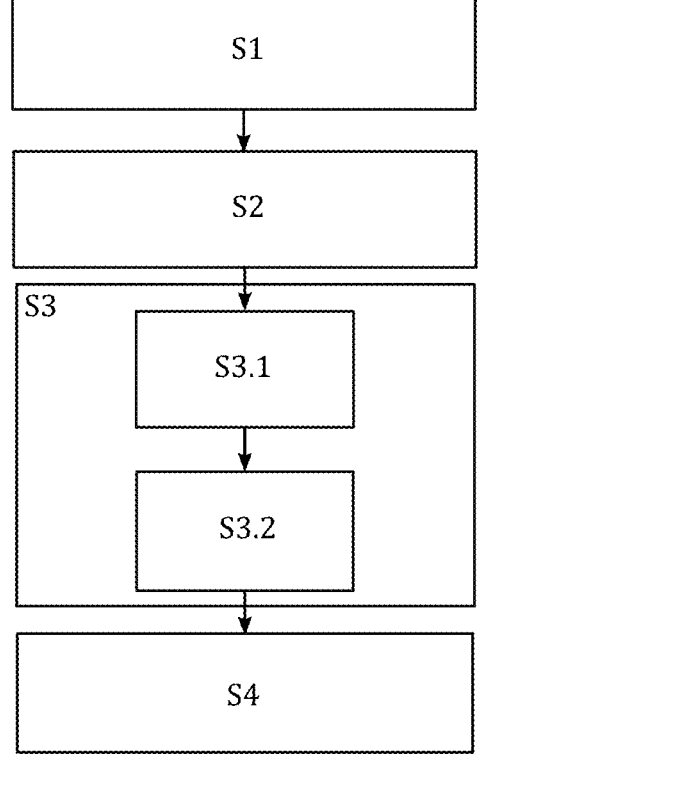
FIG. 3 shows a schematic flow chart of an embodiment of the method for transmitting tool data according to the invention.
FIG. 4 shows a schematic flow diagram of an embodiment of the method of inserting a tool according to the invention.

FIG. 3 shows a schematic flow chart of an embodiment of the method according to the invention for transmitting tool data to a control device of a numerically controlled machine tool using a data interface device which acts as an interface between the control device and a tool data management device.

In step S1, tool data of a tool usable in numerically controlled machine tools is received from a tool data management device by the data interface device.

In step S2, a control device of a machine tool to receive the tool data is selected from a plurality of control devices connected to the data interface device.

In step S3, the received tool data is converted by the data interface device, comprising sub steps S3.1 and S3.2.

In sub step S3.1, the target data format is selected, whereby the selected target data format can be read out by the selected control device receiving the tool data to be transmitted, such that the machine tool associated with the selected control device can be controlled as a function of the tool data received from the selected control device.

In sub step S3.2, the data interface device converts the received tool data into the selected target data format.

In step S4, the converted tool data is transmitted to the selected control device by the data interface device.

FIG. 4 shows a schematic flow chart of an example of the method according to the invention for inserting a tool into a tool magazine of a numerically controlled machine tool by means of a tool changing device of the machine tool. The tool magazine comprises a plurality of magazine slots each for receiving a tool.

In step S1, a tool is handled by the tool changing device of the machine tool. The handling can include, for example, picking up the tool from a fixture of a working spindle of the machine tool or picking up the tool from a transport device that is configured to deliver tools to the machine tool.

In step S2, tool data of the handled tool is provided for use by a control device of the machine tool, wherein the tool data comprises at least a geometric dimension of the handled tool.

In step S3, the control device selects an unoccupied magazine slot for the handled tool from a set of unoccupied magazine slots of the tool magazine based on the provided tool data.

In step S4, the handled tool is inserted into the selected unoccupied magazine slot of the tool magazine by the tool changing device.

Above, embodiments of the present invention and advantages thereof have been described in detail with reference to the accompanying figures.

It is again emphasized that the present invention is in no way limited to the above-described embodiments and their features. The invention further encompasses modifications of the aforementioned embodiments, in particular those resulting from modifications and/or combinations of individual or multiple features of the described embodiments within the scope of protection of the independent claims.

LIST OF REFERENCE SIGNS 1 tool data management device
2 data interface device
3, 3a, 3b machine tool
4 tool
11 presetting device
12 storage device of the tool data management device
21 first interface module
22 second interface module
23 data processing unit
31, 31a, 31b control device
32 actuators
33 detection device
41 RFID chip
311, 311a, 311b storage unit
312, 312a, 312b control unit
321 tool magazine
321a-e magazine slots
322 tool changing device
323 working spindle
1000 manufacturing system

The invention claimed is:

1. A data interface device (2), comprising:
   a first interface module (21) configured to receive, from a tool data management device (1), tool data of a tool usable in numerically controlled machine tools;
   a second interface module (22) configured to be connected to a plurality of control devices (31a, 31b) of numerically controlled machine tools (3a, 3b) and to transmit tool data of tools usable in the numerically controlled machine tools (3a, 3b) to the control devices (31a, 31b) of the numerically controlled tool machine tools (3a, 3b); and
   a data processing unit (23) configured to receive tool data in a data format from the first interface module (21) and to convert the data format of the tool data received via the first interface module (21) into a target data format and to transmit tool data in the target data format to the second interface module (22), wherein the target data format is different than the data format of the tool data received via the first interface module (21) and is readable by a respective control device (31a; 31b) of the plurality of control devices (31a, 31b) which receives the tool data, such that the machine tool (3a; 3b), associated with said respective control device (31a; 31b) which receives the tool data, is controlled in accordance with the tool data received by the respective control device (31a; 31b).

2. The data interface device (2) according to claim 1, wherein
   the data interface device (2) comprises a storage unit in which configuration data is stored, which assigns to each control device (31a, 31b) of the plurality of control devices (31a, 31b) a data format for tool data readable by the respective control device (31a, 31b) from a plurality of data formats, wherein the data processing unit (23) is configured to select the target data format on the basis of the configuration data stored in the storage unit.

3. The data interface device (2) according to claim 1, wherein
   the data interface device (2) is further configured to receive tool data of a tool from the plurality of control devices (31a, 31b) via the second interface module (22) and to transmit the tool data to the tool data management device (1) via the first interface module (21), wherein the data processing unit (23) is configured to convert a data format of the tool data received via the second interface module (22) into a data format readable by the tool data management device (1).

4. The data interface device (2) according to claim 1, wherein
   the data format of the tool data used by the tool data management device (1) is an OPC-UA-data format.

5. The data interface device (2) according to claim 1, wherein
   said second interface module (22) is configured to select a communication protocol used by a respective control device (31a; 31b) of said plurality of control devices (31a, 31b) from a plurality of communication protocols for data transmission therewith.

6. The data interface device (2) according to claim 1, wherein
   the first interface module (21) is configured to access tool data stored in a storage device (12) of the tool data management device (1).

7. The data interface device (2) according to claim 6, wherein the data interface device (2) is configured to store tool data of a tool in the storage device (12) of the tool data management device (1) via the first interface module (21) and/or to change and/or delete tool data of a tool stored there.

8. The data interface device (2) according to claim 6, wherein the data interface device (2) is configured to receive, via the second interface module (22), a tool ID, by which a specific tool is identifiable, from a control device (31*a*, 31*b*) of the plurality of control devices (31*a*, 31*b*), and to access, via the first interface module (21), tool data associated with the specific tool stored in the storage device (12) of the tool data management device (1) on the basis of the received tool ID, and to transmit said tool data to the control device (31*a*, 31*b*) via the second interface module (22).

9. The data interface device (2) according to claim 1, wherein the data interface device (2) is configured to receive, via the first interface module (21), a machine ID together with the tool data of the tool, by which a specific machine tool (3*a*, 3*b*) is identifiable, wherein the second interface module (22) is configured to select a control device (31*a*, 31*b*) associated with the specific machine tool (3*a*, 3*b*) on the basis of the received machine ID, and to transmit the tool data received together with the machine ID via the first interface module (21) to the selected control device (31*a*, 31*b*).

10. The data interface device (2) according to claim 1, wherein the data interface device (2) is configured to access a storage unit (311*a*, 311*b*) of a control device (31*a*, 31*b*) of the plurality of control devices (31*a*, 31*b*) via the second interface module (22) and to store tool data of a tool there and/or to change and/or delete tool data of a tool stored there.

11. The data interface device (2) according to claim 1, wherein the tool data of a tool contains one or more of the following tool characteristics:

a dynamic and/or static unbalance of the tool;

a diameter and/or radius and/or a length of the tool;

a weight of the tool;

a total time of usage of the tool; and a degree of wear of the tool.

12. The data interface device (2) according to claim 1, wherein the data interface device (2) is partially or totally cloud-based.

13. A manufacturing system (1000) comprising:

a plurality of numerically controlled machine tools (3*a*, 3*b*), each comprising a control device (31*a*, 31*b*) configured to control the machine tool (3*a*, 3*b*);

a tool data management device (1) for managing tool data of tools usable in numerically controlled machine tools (3*a*, 3*b*); and a data interface device (2) according to claim 1, the first interface module (21) of which is connected to the tool data management device (1) for data transmission and the second interface module (22) of which is connected to each control device (31*a*, 31*b*) of the plurality of numerically controlled machine tools (3*a*, 3*b*) for data transmission.

14. The manufacturing system (1000) according to claim 13, wherein the tool data management device (1) comprises a presetting device (11) which is configured to detect at least one tool characteristic of a tool inserted into the presetting device (11) and to generate tool data of the inserted tool based thereon.

15. The manufacturing system (1000) according to claim 14, wherein the presetting device (11) is configured to send the generated tool data of the inserted tool to the data interface device (2) and/or to store it in a storage device (12) of the tool data management device (1) and/or to change tool data of the inserted tool already stored there on the basis of the generated tool data.

16. The manufacturing system (1000) according to claim 13, wherein at least one machine tool (3*b*) of the plurality of machine tools (3*a*, 3*b*) comprises a tool magazine (321) having a plurality of magazine slots for receiving a respective tool, and a tool changing device (322) which is configured to insert and remove tools at the magazine slots of the tool magazine (321), wherein the control device (31*b*) of the at least one machine tool (3*b*) is configured to select an unoccupied magazine slot from a set of unoccupied magazine slots of the tool magazine (321) on the basis of tool data of a tool handled by the tool changing device (322) provided to the control device (31*b*) and to control the tool magazine (3*a*, 3*b*) in such a way that the handled tool is inserted by the tool changing device (322) into the selected unoccupied magazine slot of the tool magazine (321).

17. The manufacturing system (1000) according to claim 16, wherein the tool data of the tool (4) handled by the tool changing device and provided to the control device (31*a*, 31*b*) of the at least one machine tool (3*a*, 3*b*) contain at least one geometric dimension of the tool (4), on the basis of which the control device (31*a*, 31*b*) selects the unoccupied magazine slot.

18. A numerically controlled machine tool (3) comprising:

a tool magazine (321) comprising a plurality of magazine slots (321*a-e*) each for receiving a tool;

a tool changing device (322) configured to insert and remove tools at the magazine slots (321*a-e*) of the tool magazine (321); and a control device (31), for controlling the machine tool (3), configured to select an unoccupied magazine slot (321*c*) for a tool (4) handled by the tool changing device (322) from a set of unoccupied magazine slots (321*b-d*) of the tool magazine (321) on the basis of tool data of said handled tool (4) provided to the control device, wherein the tool data comprises at least a geometrical dimension of said handled tool (4), and to control the machine tool (3) in such a way that the handled tool (4) is inserted into the selected unoccupied magazine slot (321*c*) of the tool magazine (321) by the tool changing device (322).

19. The numerically controlled machine tool (3) according to claim 18, wherein the machine tool (3) comprises a detection device coupled to the control device (31), which is configured to detect at least one geometric dimension of the tool (4) handled by the tool changing device (322) and to provide this to the control device (31) as tool data, on the basis of which the control device (3) selects the unoccupied magazine slot (321*c*).

20. The numerically controlled machine tool (3) according to claim 18, wherein the machine tool (3) comprises a detection device (33) which is coupled to the control device (31) and is configured to detect a tool ID, via which a specific tool can be identified, of the tool (4) handled by the tool changing device (322) and to transmit it to the control device (31), wherein the control device (31) is configured to access tool data associated with the handled tool (4) stored in a storage unit (311) of the control device (31) on the basis of the received tool ID and to use these for selecting the unoccupied magazine slot (321c).

21. The numerically controlled machine tool (3) according to claim 18, wherein the control device (31) is coupled to a data interface device (2) according to claim 1 for receiving tool data of a tool and is configured to store tool data received from the data interface device (2) in the storage unit (311) of the control device (31).

22. The numerically controlled machine tool (3) according to claim 18, wherein the tool magazine (321) is designed as a wheel magazine which is rotatably movable about an axis of rotation relative to a machine bed of the machine tool for aligning a magazine slot with respect to the tool changing device (322), wherein the magazine slots are arranged circumferentially, and removal directions of the magazine slots extend radially with respect to the axis of rotation.

23. The numerically controlled machine tool (3) according to claim 18, wherein the at least one geometric dimension of the handled tool (4) is an outer diameter or an outer radius or a length of the tool (4).

* * * * *